US012656704B2

(12) United States Patent
Mizukoshi et al.

(10) Patent No.: US 12,656,704 B2
(45) Date of Patent: Jun. 16, 2026

(54) IMAGE FORMING APPARATUS HAVING CHARGING VOLTAGE AND DEVELOPING VOLTAGE STEPWISE CONTROL

(71) Applicant: CANON KABUSHIKI KAISHA, Tokyo (JP)

(72) Inventors: Shunsuke Mizukoshi, Tokyo (JP); Yusuke Shimizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/432,258

(22) Filed: Feb. 5, 2024

(65) Prior Publication Data

US 2024/0288792 A1 Aug. 29, 2024

(30) Foreign Application Priority Data

Feb. 21, 2023 (JP) ................................ 2023-025649

(51) Int. Cl.
*G03G 15/02* (2006.01)
*G03G 15/06* (2006.01)

(52) U.S. Cl.
CPC ....... *G03G 15/0266* (2013.01); *G03G 15/065* (2013.01); *G03G 2215/021* (2013.01)

(58) Field of Classification Search
None
See application file for complete search history.

(56) References Cited

U.S. PATENT DOCUMENTS 10,216,115 B2 * 2/2019 Kidaka .............. G03G 15/0283
10,331,070 B2 * 6/2019 Tanaka ............... G03G 15/0266
10,788,769 B2 * 9/2020 Katagiri ............. G02B 27/0977
11,640,123 B2 * 5/2023 Shimizu ............... G03G 15/065 399/53
11,953,841 B2 * 4/2024 Otsuka ............... G03G 15/5004
2014/0178086 A1 * 6/2014 Kitamura ............. G03G 15/043 399/46
2019/0056677 A1 * 2/2019 Oki .................... G03G 15/1695
(Continued)

FOREIGN PATENT DOCUMENTS

JP H07-253693 A 10/1995
JP H11-52640 A 2/1999
(Continued)

*Primary Examiner* — Arlene Heredia Ocasio
(74) *Attorney, Agent, or Firm* — VENABLE LLP

(57) ABSTRACT

An image forming apparatus includes a controller to perform a preparation operation before start of image formation so that rotation of an image bearing member is started while in contact with a developing member, and a charging voltage and a developing voltage are changed stepwise respectively so that a potential difference between a surface potential of the image bearing member and the developing voltage in a developing portion becomes a predetermined value. The controller changes the charging voltage to a voltage of the same polarity as during the image formation and an absolute value thereof lower than a discharge start voltage from a state in which the charging voltage is not applied to the charging member, and then changes the charging voltage to a plurality of values of the same polarity as during the image formation and the absolute value thereof equal to or greater than the discharge start voltage.

11 Claims, 9 Drawing Sheets

(56) References Cited

U.S. PATENT DOCUMENTS

| | | | | |
|---|---|---|---|---|
| 2022/0342339 | A1* | 10/2022 | Shimizu ............. | G03G 15/0808 |
| 2023/0125722 | A1* | 4/2023 | Tokiwa .............. | G03G 15/0266 399/168 |
| 2023/0288857 | A1 | 9/2023 | Akizuki et al. | |
| 2024/0402628 | A1* | 12/2024 | Hara .................. | G03G 21/0035 |

FOREIGN PATENT DOCUMENTS

| | | | |
|---|---|---|---|
| JP | 2001-092197 | A | 4/2001 |
| JP | 2005-345915 | A | 12/2005 |
| JP | 2018-159767 | A | 10/2018 |

* cited by examiner

IMAGE FORMING APPARATUS HAVING CHARGING VOLTAGE AND DEVELOPING VOLTAGE STEPWISE CONTROL

FIELD OF THE INVENTION AND RELATED ART

The present invention relates to an image forming apparatus such as a printer, copier, or a facsimile device using an electrophotographic or electrostatic recording method.

Conventionally, in an image forming apparatus such as a printer using an electrophotographic method for example, a surface of a photosensitive member is uniformly charge-processed by a charging device, and the charged surface of the photosensitive member is exposed by an exposure device and an electrostatic latent image is formed on the surface of the photosensitive member. Then, the electrostatic latent image formed on the surface of the photosensitive member is developed when toner as developer is supplied by a developing device, and a toner image is formed on the surface of the photosensitive member.

In such an image forming apparatus, a phenomenon called "fogging" may occur in which toner adheres to a portion on the surface of the photosensitive member where toner should not adhere originally. In order to reduce fogging, it is necessary to control back contrast to be within an appropriate range. Back contrast is a potential difference between a potential (dark portion potential) of a non-image portion (unexposed portion) on the surface of the photosensitive member and a voltage (developing bias) applied to the developer bearing member in a developing portion in which the photosensitive member opposes a developer bearing member included in the developing device.

Further, in recent years, as image forming apparatuses become smaller, image forming apparatuses are not provided with a contact/separation mechanism for switching the contact/separation state between the developer bearing member and the photosensitive member, and a configuration (development separation-less configuration) in which the developer bearing member and the photosensitive member are substantially always in contact with each other may be adopted. In this configuration, when driving of the photosensitive member is started, a developing bias having a polarity opposite to the normal charging polarity of the toner is applied to the developer bearing member, thereby reducing fogging at the start of the image forming apparatus (herein also referred to as "fogging at startup"). This method is described in Japanese Laid-Open Patent Application (JP-A) 2005-345915. Further, by raising the voltage (charging bias) applied to the charging device and the developing bias stepwise when driving of the photosensitive member is started, back contrast can be maintained within a predetermined range, and toner consumption due to fogging can be reduced. This method is described in Japanese Laid-Open Patent Application (JP-A) H7-253693.

However, when considering how to maintain the back contrast within a predetermined range at the start of the image forming apparatus, the following problems arise.

Even if the charging bias and developing bias are controlled to rise in a rectangular manner as described in, for example, Japanese Laid-Open Patent Application (JP-A) H7-253693, it actually takes a certain amount of time (herein also referred to as "delay") for the charging bias and developing bias to rise to a predetermined value. This is due to internal resistance of circuits and members in the image forming apparatus. Also, the delay has a certain degree of variance among individual image forming apparatuses. Such variance in delay causes changes in the surface potential of the photosensitive member and in the transition of the developing bias to occur. As a result, the back contrast may not reach a desired value and may cause fogging to increase temporarily.

SUMMARY OF THE INVENTION

Therefore, an object of the present invention is to suppress a temporary increase in fogging during a preparation operation before image formation.

The above object is achieved by an image forming apparatus according to the present invention. According to an aspect of the present invention, there is provided an image forming apparatus comprising: a rotatable image bearing member; a charging member configured to charge a surface of an image bearing member; a developing member in contact with the surface of the image bearing member in a developing portion and configured to form a toner image by supplying toner to the surface of the image bearing member charged by the charging member; a charging voltage applying portion configured to apply a charging voltage to the charging member; a developing voltage applying portion configured to apply a developing voltage to the developing member; and a controller configured to control the charging voltage applying portion and the developing voltage applying portion, wherein the controller controls to perform a preparation operation before start of image formation in which the toner image to be transferred to a recording material is formed on the image bearing member so that rotation of the image bearing member is started in a state in which the developing member is in contact with the image bearing member, and the charging voltage and the developing voltage are changed stepwise respectively so that a potential difference between a surface potential of the image bearing member and the developing voltage in the developing portion becomes a predetermined value, wherein while changing the charging voltage stepwise in the preparation operation, the controller controls the charging voltage applying portion so as to change the charging voltage to a voltage of the same polarity as during the image formation and an absolute value thereof lower than a discharge start voltage from a state in which the charging voltage is not applied to the charging member, and then so as to change the charging voltage to a plurality of values of the same polarity as during the image formation and the absolute value thereof equal to or greater than the discharge start voltage.

Further features of the present invention will become apparent from the following description of exemplary embodiments with reference to the attached drawings.

Figure 8:
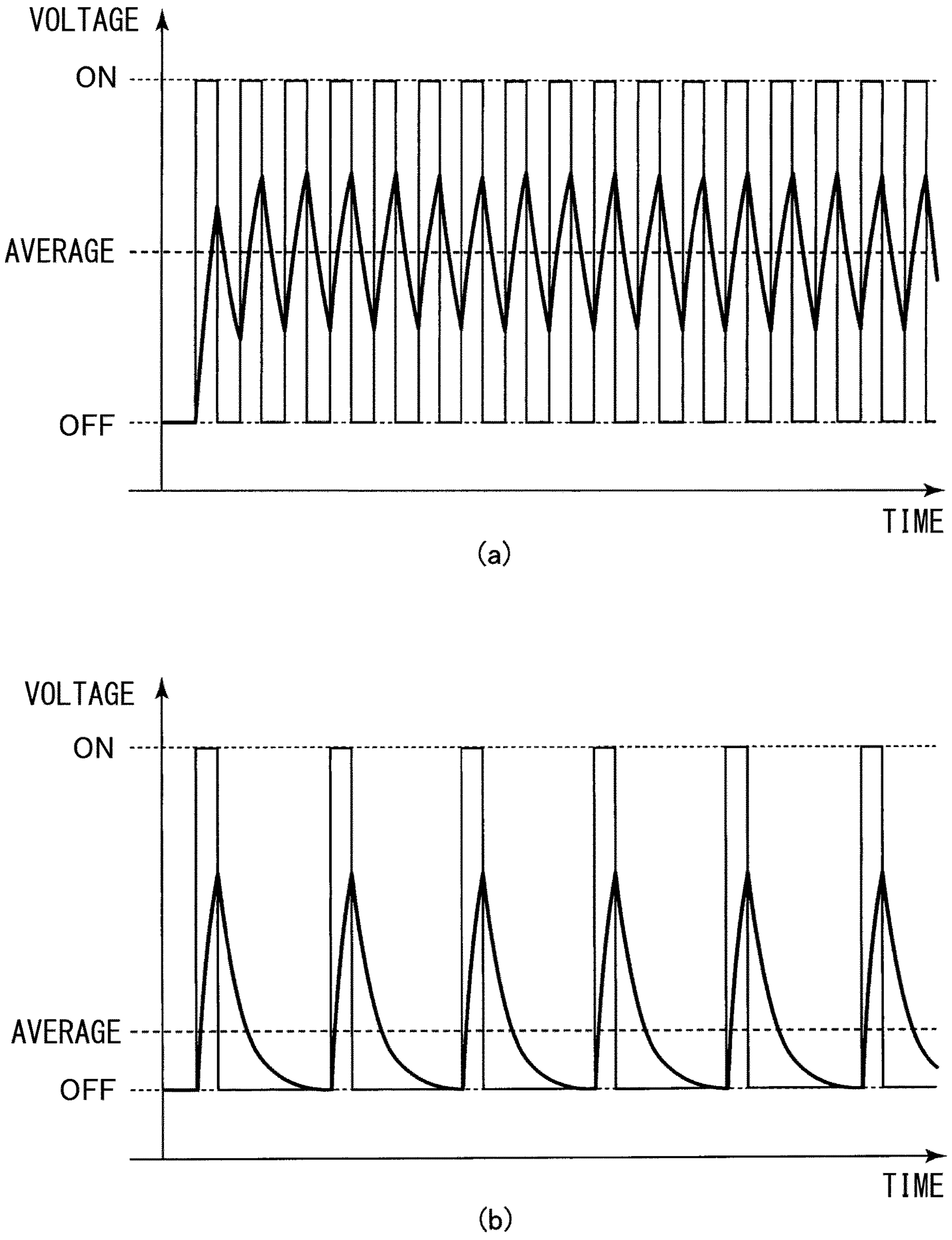

Parts (a) and (b) of FIG. 8 are a graph for explaining transfer bias control in a second embodiment.

Figure 9:
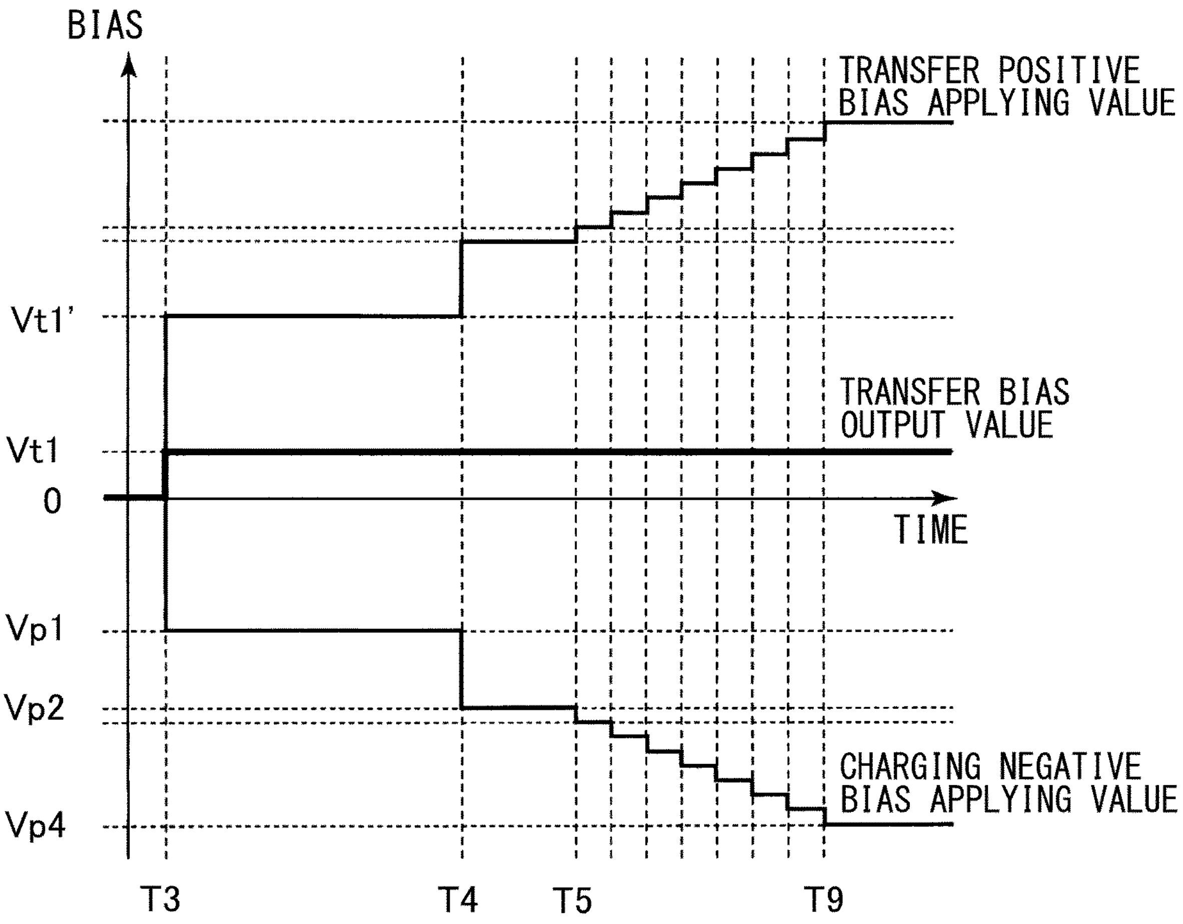

FIG. 9 is a timing chart showing the time transition of the applied bias in the preparation operation of the second embodiment.

DESCRIPTION OF THE EMBODIMENTS

In the following, an image forming apparatus according to the present invention will be explained in further detail with reference to the figures. The dimensions, materials, shapes, and relative arrangements of components described in the following embodiments should be appropriately changed according to the configuration and various conditions of the apparatus to which the present invention is applied, and are not intended to limit the scope of the present invention to the following embodiments.

1. Configuration and Image Forming Process of Image Forming Apparatus

Figure 1:
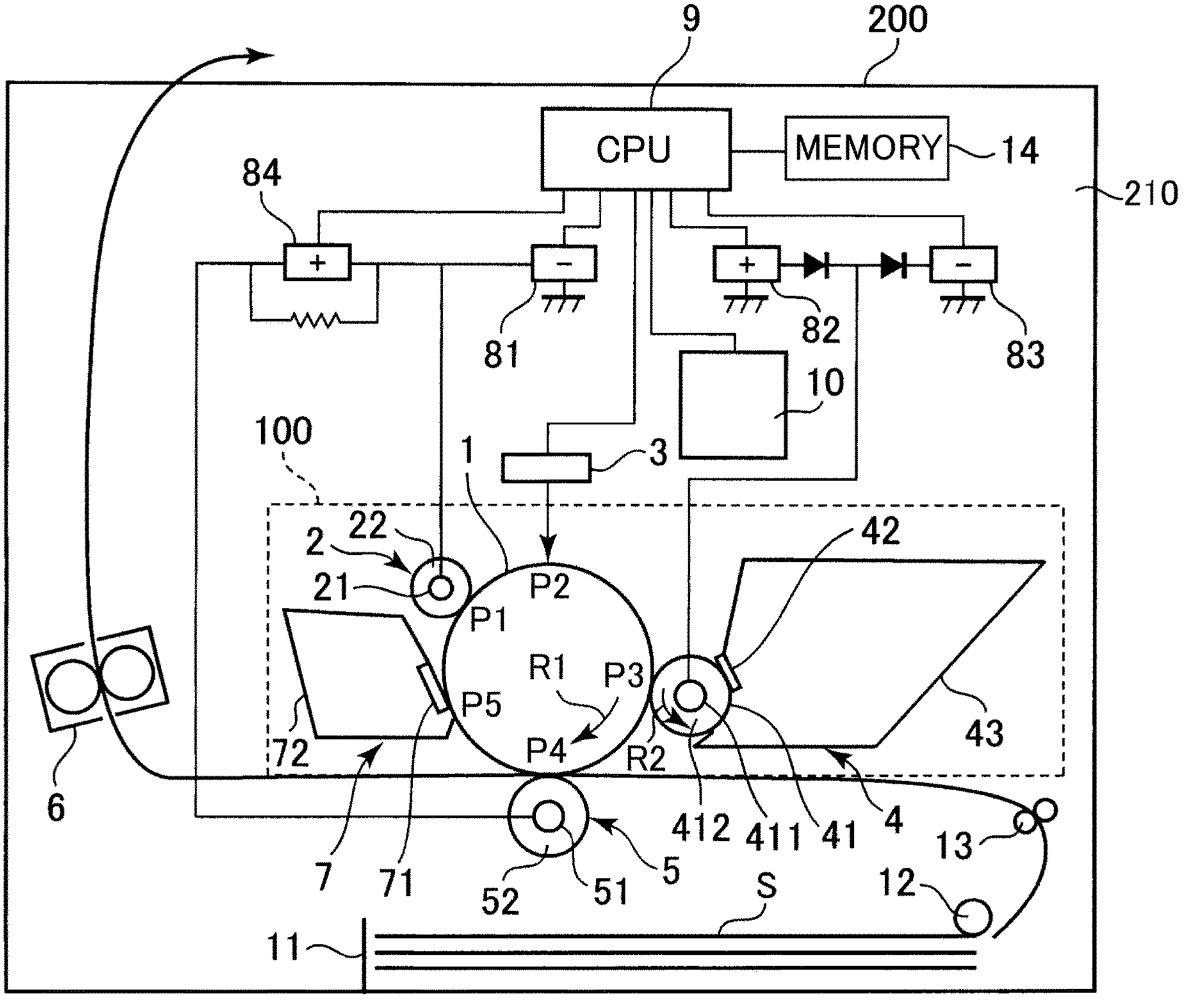
FIG. 1 is a schematic sectional view of an image forming apparatus.

First, a configuration and image forming process (image forming operation) of an image forming apparatus 200 of the present embodiment will be explained using FIG. 1. FIG. 1 is a schematic sectional view of the image forming apparatus 200 of the present embodiment.

The image forming apparatus 200 of the present embodiment includes a process cartridge 100 which is removably attached to a main assembly 210 of the image forming apparatus. A photosensitive drum 1, a charging roller 2 as a process means which acts on the photosensitive drum 1, a developing device (developing unit) 4, and a cleaning device (cleaning unit) 7 are integrated together to form the process cartridge 100. Here, the main assembly 210 is a portion of the image forming apparatus 200 excluding the process cartridge 100.

The process cartridge 100 executes a portion of the image forming process while attached to the main assembly 210.

When the image forming process is started, the photosensitive drum 1, which is a rotatable drum-shaped (cylindrical) photosensitive member (electrophotographic photosensitive member) as an image bearing member, is rotatably driven at a predetermined circumferential speed (process speed) in the direction of an arrow R1 (clockwise direction) in the Figure. The photosensitive drum 1 is rotated by a driving force transmitted from a drive motor (main motor) 10 as a driving source which comprises a driving means.

The surface of the rotating photosensitive drum 1 is uniformly charge-processed to a predetermined potential of a predetermined polarity (negative polarity in the present embodiment) by a charging roller 2, which is a roller-type charging member as a charging means. The charging roller 2 includes a conductive charging roller metal core 21 and a conductive rubber layer (elastic layer) 22 formed around the charging roller metal core 21. The charging roller 2 is disposed in contact with the photosensitive drum 1, and is driven to rotate around the charging roller metal core 21 as the photosensitive drum 1 rotates. The charging roller metal core 21 is connected to a charging negative power source 81 as a charging bias applying means (charging bias applying portion) that applies a charging negative bias, which is a DC voltage of negative polarity (the same polarity as the charging polarity of the photosensitive drum 1) as a charging bias (charging voltage), to the charging roller 2.

During image formation (charge-processing), a charging negative bias is applied to the charging roller 2 by a charging negative power source 81. A position on the photosensitive drum 1 in the rotational direction of the photosensitive drum 1 where charge-processing is performed by the charging roller 2 is a charging portion (charging position) P1. The charging roller 2 charges the surface of the photosensitive drum 1 by the discharge generated in at least one minute void (gap) between the photosensitive drum 1 and the charging roller 2, which is formed upstream and downstream of the contact portion between the photosensitive drum 1 and the charging roller 2 in the rotational direction of the photosensitive drum 1. However, for the sake of simplicity, it may be assumed that the contact portion between the photosensitive drum 1 and the charging roller 2 is the charging portion (charging position) P1. Incidentally, the position of the charging portion P1 is represented by the center position of the photosensitive drum 1 in the rotational direction.

The charge-processed surface of the photosensitive drum 1 is scanned and exposed by a laser beam emitted from an exposure device (laser scanner) 3 as an exposure means, and an electrostatic latent image (electrostatic image) is formed on the photosensitive drum 1. The position on the photosensitive drum 1 in the rotational direction of the photosensitive drum 1 where light is irradiated by the exposure device 3 is an exposure portion (exposure position) P2.

The electrostatic latent image formed on the photosensitive drum 1 is developed (visualized) when toner as developer is supplied by a developing device 4 as a developing means, and a toner image (developer image) is formed on the photosensitive drum 1. In the present embodiment, toner that is charged with the same polarity (negative polarity in the present embodiment) as the charging polarity of the photosensitive drum 1 adheres to the exposed portion (image portion) where the absolute value of the potential has decreased by being exposed to light after being uniformly charge-processed (reversal development method). In the present embodiment, the normal charging polarity of the toner, which is the main charging polarity of the toner during development, is a negative polarity. The developing device 4 includes a developing container 43 which stores toner as developer, a developing roller 41 as a developer carrier (developing member), and a regulating blade 42 as a developer regulating member. Fine inorganic particles (external additives) are added to the surface of the toner to impart the desired chargeability and fluidity to the toner. The developing roller 41 includes a conductive developing roller metal core 411 and a conductive rubber layer (elastic layer) 412 formed around the developing roller metal core 411. The developing device 4 is pressurized by a pressure spring, which is a biasing member as a biasing means, so that the developing roller 41 contacts the photosensitive drum 1 with a predetermined pressure. In the present embodiment, the developing roller 41 is always in contact with the photosensitive drum 1 while the process cartridge 100 is attached to the main assembly 210. The developing roller 41 is rotatably driven at a predetermined peripheral speed around the developing roller metal core 411 in the direction of an arrow R2 (counterclockwise direction) in the Figure. In the present embodiment, the developing roller 41 is rotatably driven such that the peripheral speed ratio, which is the ratio between the peripheral speed of the photosensitive drum 1 and the peripheral speed of the developing roller 41, is a predetermined peripheral speed ratio. Further, in the present embodiment, the developing roller 41 is rotated by a driving force transmitted from the drive motor 10 which is common to the photosensitive drum 1. The rotation of the developing roller 41 is started and stopped in synchronization with the start and stop of the rotation of the photosensitive drum 1. The developing roller metal core 411 is connected to a developing negative power source 83 as a developing bias applying means (developing bias applying portion) that applies a negative developing bias, which is a DC voltage of negative polarity (the same polarity as the charging polarity of the photosensitive drum 1) as a developing bias (developing voltage) to the developing roller 41. During image formation (during development), a negative developing bias is applied to the developing roller 41 by the developing negative power source 83. This negative developing bias causes the toner to move from the developing roller 41 to the surface of the photosensitive drum 1, thereby making the electrostatic latent image visible and forming a toner image. Further, a developing positive power source 82 as a developing bias applying means (developing bias applying portion) that applies a positive developing bias, which is a DC voltage of positive polarity (the opposite polarity of the charging polarity of the photosensitive drum 1) as a developing bias, to the developing roller 41 is also connected to the developing roller metal core 411. As a result, as described below, it is possible to apply a predetermined value of bias to the developing roller 41 by appropriately selecting the positive developing bias and the negative developing bias. Furthermore, the regulating blade 42 is arranged in contact with the developing roller 41.

The regulating blade 42 regulates the amount of toner carried on the developing roller 41 and imparts a predetermined charge to the toner, mainly by friction charging. The position (the contact portion between the developing roller 41 and the photosensitive drum 1) on the photosensitive drum 1 in the rotational direction of the photosensitive drum 1 where the developing roller 41 supplies toner is a developing portion (developing position) P3. Incidentally, the position of the developing portion P3 is represented by the center position of the photosensitive drum 1 in the rotational direction.

The toner image formed on the photosensitive drum 1 is transferred to a recording material S as a transferred member, which is conveyed while being nipped between the photosensitive drum 1 and a transfer roller 5 by the transfer roller 5, which is a roller-type transfer member as a transfer means. The transfer roller 5 includes a conductive transfer roller metal core 51 and a urethane foam layer (elastic layer) 52 formed around the transfer roller metal core 51.

The transfer roller 5 contacts the photosensitive drum 1 when the recording material S is not interposed. The transfer roller metal core 51 is connected to a transfer positive power source 84 as a transfer bias applying means (transfer bias applying portion) that applies a positive transfer bias, which is a DC voltage of positive polarity (the opposite polarity of the normal charging polarity of the toner) as a transfer bias (transfer voltage) to the transfer roller 5. During image formation (transfer), a positive transfer bias is applied to the transfer roller 5 by a transfer positive power source 84.

A toner image including negative polarity toner on the photosensitive drum 1 is transferred to the recording material S by this positive transfer bias. Further, the transfer roller metal core 51 is also connected to the charging negative power source 81 described above, and by adjusting the respective biases outputted by the charging negative power source 81 and the transfer positive power source 84, a bias of a predetermined value can be applied to the transfer roller 5. The position (the contact portion between the transfer roller 5 and the photosensitive drum 1) on the photosensitive drum 1 in the rotational direction of the photosensitive drum 1 where the toner image is transferred to the recording material S by the transfer roller 5 is a transfer portion (transfer position) P4. Incidentally, the position of the transfer portion P4 is represented by the center position of the photosensitive drum 1 in the rotational direction.

The recording material S such as paper or a plastic sheet is separated one by one and sent out from a cassette 11 as a recording material accommodating unit by a feed roller 12 and the like as a feeding member, and is conveyed to a registration roller 13 as a conveyance member. This recording material S is conveyed to the transfer portion P4 by the registration roller 13 so as to match the timing of the toner image on the photosensitive drum 1.

The recording material S to which the toner image has been transferred is conveyed to a fixing device (fixing unit) 6 as a fixing means. The fixing device 6 fixes (melts) the toner image on the recording material S by pressurizing and heating the recording material S bearing the unfixed toner image. The recording material S to which the toner image is fixed is discharged (outputted) to the outside of the main assembly 210.

Further, of the toner image formed on the photosensitive drum 1, a portion (transfer residual toner) remaining on the photosensitive drum 1 without being transferred to the recording material S is conveyed to a cleaning device 7 as a cleaning means by the rotation of the photosensitive drum 1. The cleaning device 7 includes a cleaning container 72 and a cleaning blade 71 as a cleaning member. The transfer residual toner is scraped off from the surface of the rotating photosensitive drum 1 by the cleaning blade 71, and is collected into the cleaning container 72. The position (the contact portion between the cleaning blade 71 and the photosensitive drum 1) on the photosensitive drum 1 in the rotational direction of the photosensitive drum 1 where toner is removed by the cleaning blade 71 is a cleaning portion (cleaning position) P5.

Thereafter, driving of the drive motor 10 is stopped, and the image forming process is completed.

The main assembly 210 is provided with a CPU 9 as a controlling portion or controller. The CPU 9 is connected to a memory (storage medium) 14 as a storage means provided on the main assembly 210. The CPU 9 exchanges various electrical information with a host device (external device) while collectively controlling the image forming process (image forming operation) of the image forming apparatus 200 using a predetermined control program stored in the memory 14 and reference tables. For example, the CPU 9 controls the value of the bias applied to the application target by the charging negative power source 81, the developing positive power source 82, the developing negative power source 83, and the transfer positive power source 84, the timing of applying the said bias to the application target, the timing of starting/stopping driving of the drive motor 10, and the like. Also, the image forming apparatus 200 forms an image on a recording material S such as a sheet based on an electrical image signal inputted from the host device to the CPU 9. Incidentally, examples of the host device include an image reader (document image reading device), personal computer, facsimile, smartphone, and the like.

2. Preparation Operation

Figure 2:
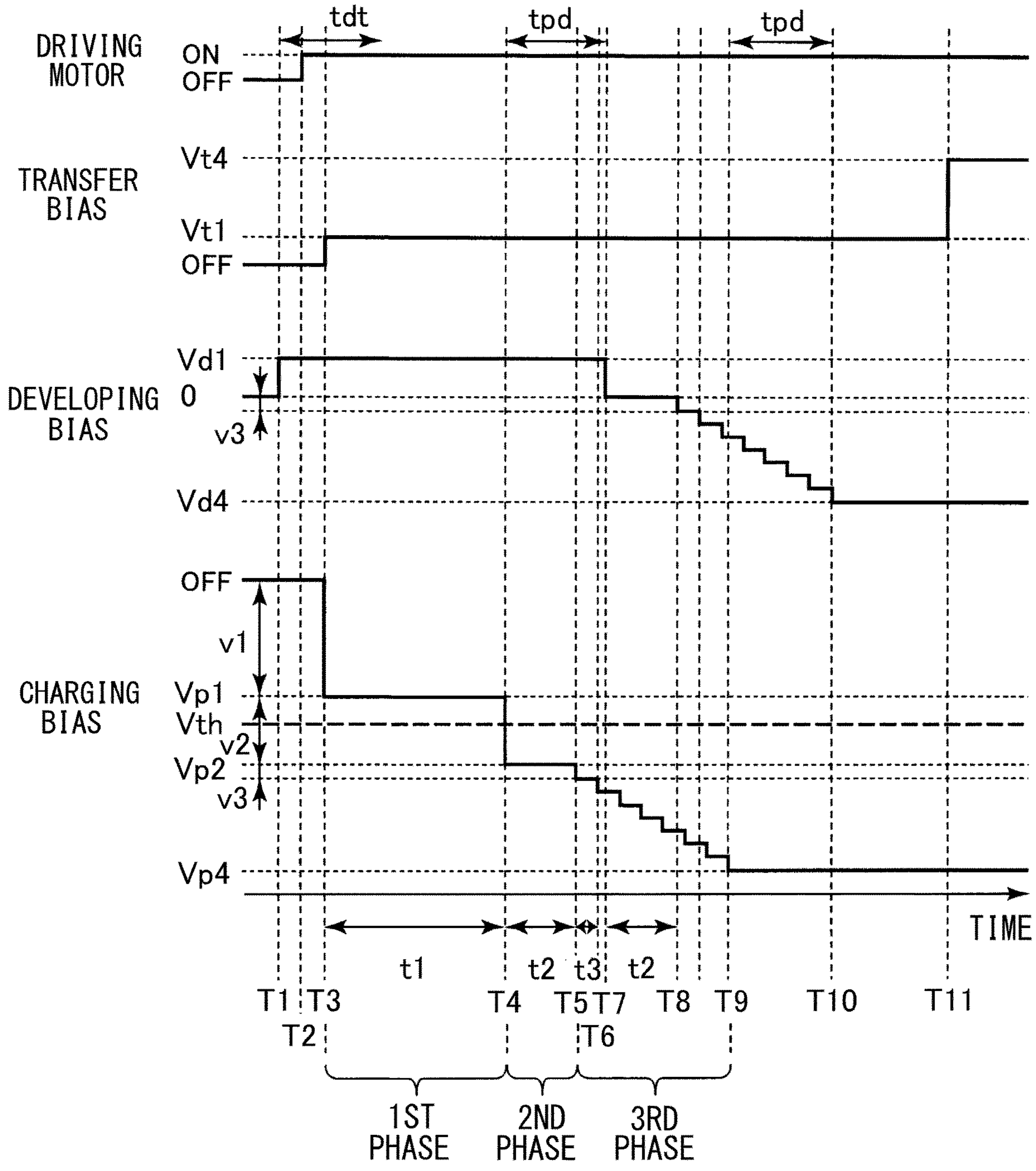
FIG. 2 is a timing chart of a preparation operation of a first embodiment.

Next, the preparation operation in the image forming process of the image forming apparatus 200 of the present embodiment will be described using FIG. 2. FIG. 2 is a timing chart showing the time transition of the target values of the ON/OFF of the driving, transfer bias, developing bias, and charging bias of the drive motor 10 related to the preparation operation (pre-rotation operation) before image formation of the image forming apparatus 200 of the present embodiment. The operation of each portion according to FIG. 2 is controlled by the CPU 9. Incidentally, the values of the biases and the like described here are examples and are not limited to these values, and may be set appropriately as necessary.

First, when the image forming process is started and the preparation operation is started, at a timing T1, application of a developing bias Vd1 to the developing roller 41 is started. At this time, the developing bias Vd1 has a positive polarity, that is, a polarity opposite to that during image formation. This is to suppress fogging at startup. As an example, the target value of the developing bias Vd1 is +100V.

In other words, the surface potential of the photosensitive drum 1 attenuates over time. For this reason, when the image forming process is completed and the image forming apparatus 200 is left unused for a certain period of time, the surface potential of the photosensitive drum 1 becomes approximately 0V. Thereafter, in the preparation operation at the start of the image forming apparatus 200, a charging bias is applied to the charging roller 2 so that the surface of the photosensitive drum 1 is charged again. Here, in the present embodiment, the developing roller 41 is always in contact with the photosensitive drum 1. For this reason, the developing bias applied to the developing roller 41 when starting driving of the photosensitive drum 1 needs to be set to a value that assumes that the surface potential of the photosensitive drum 1 in the developing portion P3 has attenuated over time.

In the present embodiment, the normal charging polarity of the toner is a negative polarity. Therefore, in portions (non-image portions) other than portions (image portions) on the photosensitive drum 1 to which toner is to be adhered, it is desirable to provide a predetermined potential difference between the surface potential of the photosensitive drum 1 in the developing portion P3 and the developing bias so that the surface potential of the photosensitive drum 1 is set to a negative polarity with respect to the developing bias. The potential difference (=|surface potential of the photosensitive drum 1−developing bias|) between the potential (dark portion potential) of the non-image portion (unexposed portion) of the surface of the photosensitive drum 1 in the developing portion P3 and the developing bias is called a "back contrast Vbc". If the value of the back contrast Vbc is not appropriate, "fogging" occurs, in which toner adheres to non-image portion. Incidentally, in the present embodiment, the target value of the back contrast Vbc is set to 100V.

As the amount of toner that causes fogging (herein also referred to as "fogging toner") increases, the amount of toner consumption increases. Further, a portion of the fogging toner is collected by the cleaning device 7. In contrast, if the cleaning device 7 is designed assuming an increase in the amount of fogging toner, this may lead to an increase in the size of the image forming apparatus 200. Further, if there is no recording material S in the transfer portion P4, a portion of the fogging toner may be scraped off by the transfer roller 5, and the transfer roller 5 may be contaminated by fogging toner. Further, if there is a recording material S in the transfer portion P4, there is a possibility of fogging toner adhering to a white background portion to which toner should not adhere, resulting in a defective image.

When considering that the back contrast Vbc is provided with respect to the surface potential of the photosensitive drum 1, which has become approximately 0V due to attenuation at the start of the image forming apparatus 200, it is preferable for the developing bias to have a positive polarity, that is, a polarity opposite to that during image formation. As a result, it is possible to reduce fogging at startup.

Next, at a timing T2, driving of the drive motor 10 is started, and rotation of the photosensitive drum 1 is started. At this time, the timing T2 at which driving of the drive motor 10 is started is a timing at which a predetermined time period has passed from the timing T1 at which the application of the developing bias to the developing roller 41 is started, taking into consideration the time until the output value of the developing bias becomes stable. As a result, the back contrast Vbc is stabilized, and the possibility of fogging occurring at startup can be lowered.

Next, at a timing T3, application of the charging bias to the charging roller 2 is started.

At this time, rather than raising the charging bias output value at once to the value during image formation, the absolute value of the charging bias output value is increased in a stepwise (multi-staged, stepped) manner. In the present embodiment, the stepwise rise of the charging bias is executed in the following three phases.

First, from a state in which no charging bias is applied to the charging roller 2, as a first phase, a charging bias Vp1 is applied to the charging roller 2 between the timing T3 and a timing T4, that is, during a time t1. At this time, the charging bias Vp1 is set to a value whose absolute value is lower than a discharge start voltage Vth between the photosensitive drum 1 and the charging roller 2. As an example, the target value of the charging bias Vp1 is −400V. Incidentally, in the present embodiment, the discharge start voltage Vth between the photosensitive drum 1 and the charging roller 2 is approximately −500V.

Next, as a second phase, a charging bias Vp2, whose absolute value is larger by a potential difference v2 than the charging bias Vp1, is applied to the charging roller 2 between the timing T4 and a timing T5, that is, during a time t2. At this time, the charging bias Vp2 is set to a value whose absolute value is greater than or equal to the discharge start voltage Vth. As an example, the target value of the charging bias Vp2 is −600V.

Next, as a third phase, from the timing T5 to a timing T9, a charging bias, whose absolute value is larger by a potential difference v3 than the charging bias currently being applied to the charging roller 2, is applied to the charging roller 2 for a time t3. This is repeated several times. As a result, the charging bias is raised to a charging bias Vp4, which is the charging bias during image formation. In the present embodiment, in the third phase, when the charging bias is raised from Vp2 to Vp4, the charging bias is raised in eight steps from the timing T5 to the timing T9. As an example, the target value of the charging bias Vp4 is −1000V. As a result, the potential (dark portion potential) of the non-image portion (unexposed portion) of the photosensitive drum 1 becomes −500V. Further, as an example, the potential difference (changing amount) v3 is 50V.

Further, at the timing T3, application of a transfer bias Vt1 to the transfer roller 5 is started at approximately the same time as the application of the charging bias Vp1 to the charging roller 2 is started. The rise of the transfer bias will be explained in more detail in the second embodiment.

Furthermore, in parallel with the control described above to raise the charging bias stepwise, control is performed to change the developing bias in a stepwise (multi-staged, stepped) manner. In the present embodiment, the stepwise rise of the developing bias is also executed in a plurality of phases (phases corresponding to the second and third phases of raising the charging bias stepwise) in response to the stepwise rise of the charging bias described above. As a result, the developing bias is raised from the developing bias Vd1 to a developing bias Vd4, which is the developing bias during image formation. As explained below, the timing of switching the developing bias is the timing delayed for the time required for the surface of the photosensitive drum 1 to move from the charging portion P1 to the developing portion P3, with respect to the timing of switching the charging bias.

As described above, before driving of the drive motor 10 is started, at the timing T1, application of the developing bias Vd1 having the opposite polarity to that during image formation to the developing roller 41 is started. Here, the time required for the surface of the photosensitive drum 1 to move from the charging portion P1 to the developing portion P3 is defined as a charging-development arrival time tpd. At this time, the developing bias is set to 0V at a timing T7 when the charging-development arrival time tpd has elapsed from the timing T4 at which the second phase of the stepwise rise of the charging bias is started. At this time, the output of the developing positive power source 82 is turned OFF at the timing T7, and after the feedback circuit (not shown) detects that the positive developing bias has attenuated to 0V, the 0V output of the developing negative power source 83 is turned ON. Thereafter, in response to the stepwise rise of the charging bias, from a timing T8, when the time t2 has elapsed from the timing T7, to a timing T10, the developing bias, whose absolute value is made larger by the potential difference v3 than the charging bias currently being applied to the developing roller 41, is applied to the developing roller 41. This is repeated several times for a time t3. As a result, the developing bias is raised to the charging bias Vd4, which is the charging bias during image formation. The timing T10 is the timing at which the charging-development arrival time tpd has elapsed from the timing T9 when the charging bias is raised to the charging bias Vp4, which is the charging bias during image formation. Incidentally, the developing bias between the timing T7 and a timing T8 only needs to be approximately 0V, and an approximate error range (for example, ±10V) is permissible. As an example, the target value of the developing bias Vd4 is −400V. Further, as described above, as an example, the potential difference (changing amount) v3 is 50V.

3. Potential Relationship in Preparation Operation

Figure 3:
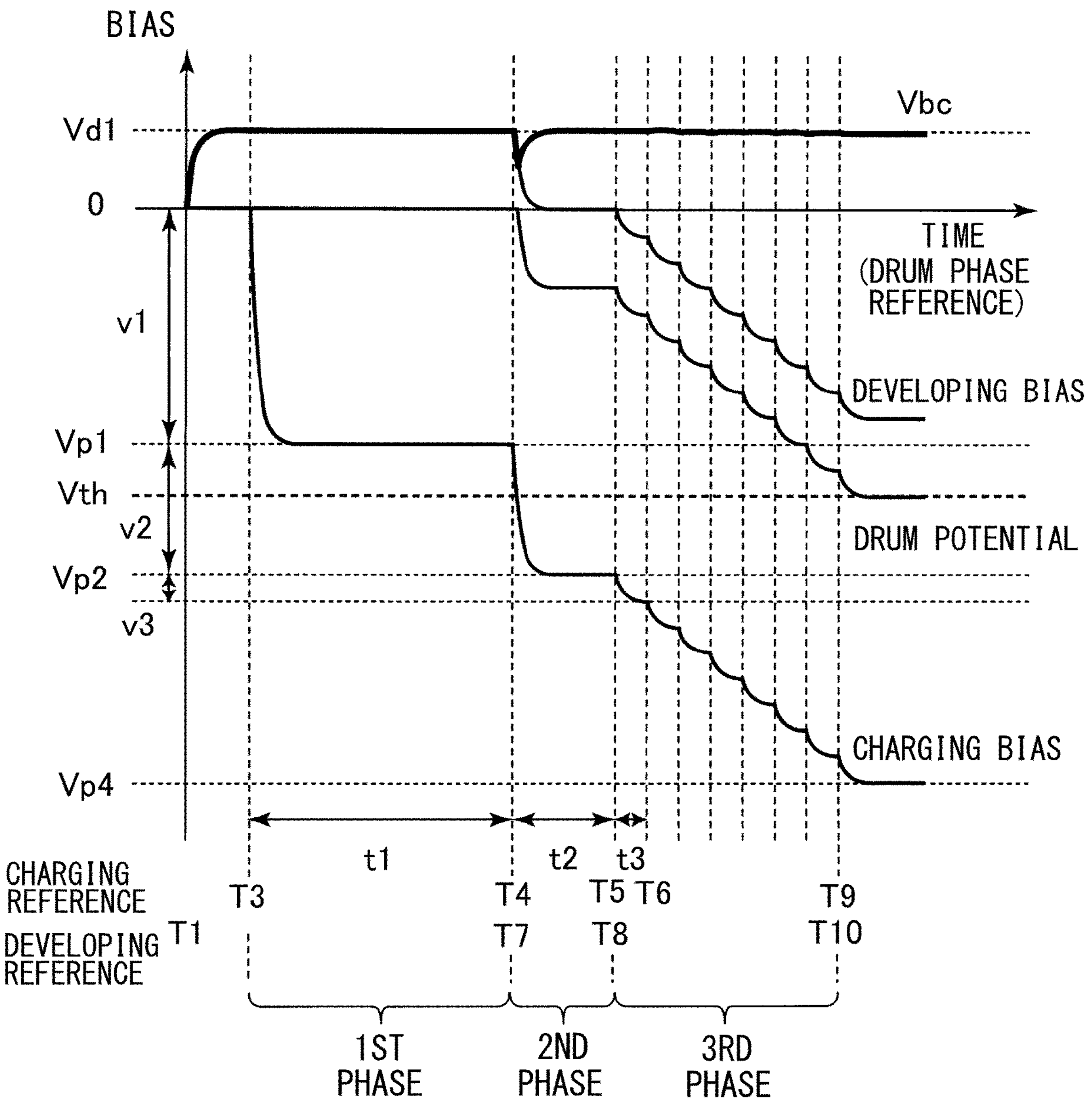
FIG. 3 is a timing chart showing the time transition of the potential and applied bias in the preparation operation of the first embodiment.

Next, the relationship between the surface potential of the photosensitive drum 1 and each applied bias in the preparation operation of the present embodiment will be explained. FIG. 3 is a timing chart showing the time transition of the surface potential of the photosensitive drum 1 and each applied bias (actual applied values) in the preparation operation of the present embodiment. In FIG. 3, in order to match the phase in the rotational direction of the photosensitive drum 1, the timing of change of the developing bias is offset by the charging-development arrival time tpd. As a result, the back contrast Vbc, which is the potential difference between the surface potential of the photosensitive drum 1 and the developing bias, is also shown on the same time axis. For example, the timing T4 for switching the charging bias from Vp1 to Vp2, and the timing T7 for switching the developing bias from Vd1 to 0V, which is delayed by the charging-development arrival time tpd with respect to the timing T4, are expressed as the same timing. Incidentally, regarding the developing bias, the phases corresponding to the second and third phases in the stepwise rise of the charging bias will also be referred to as the second and third phases, respectively.

Figure 4:
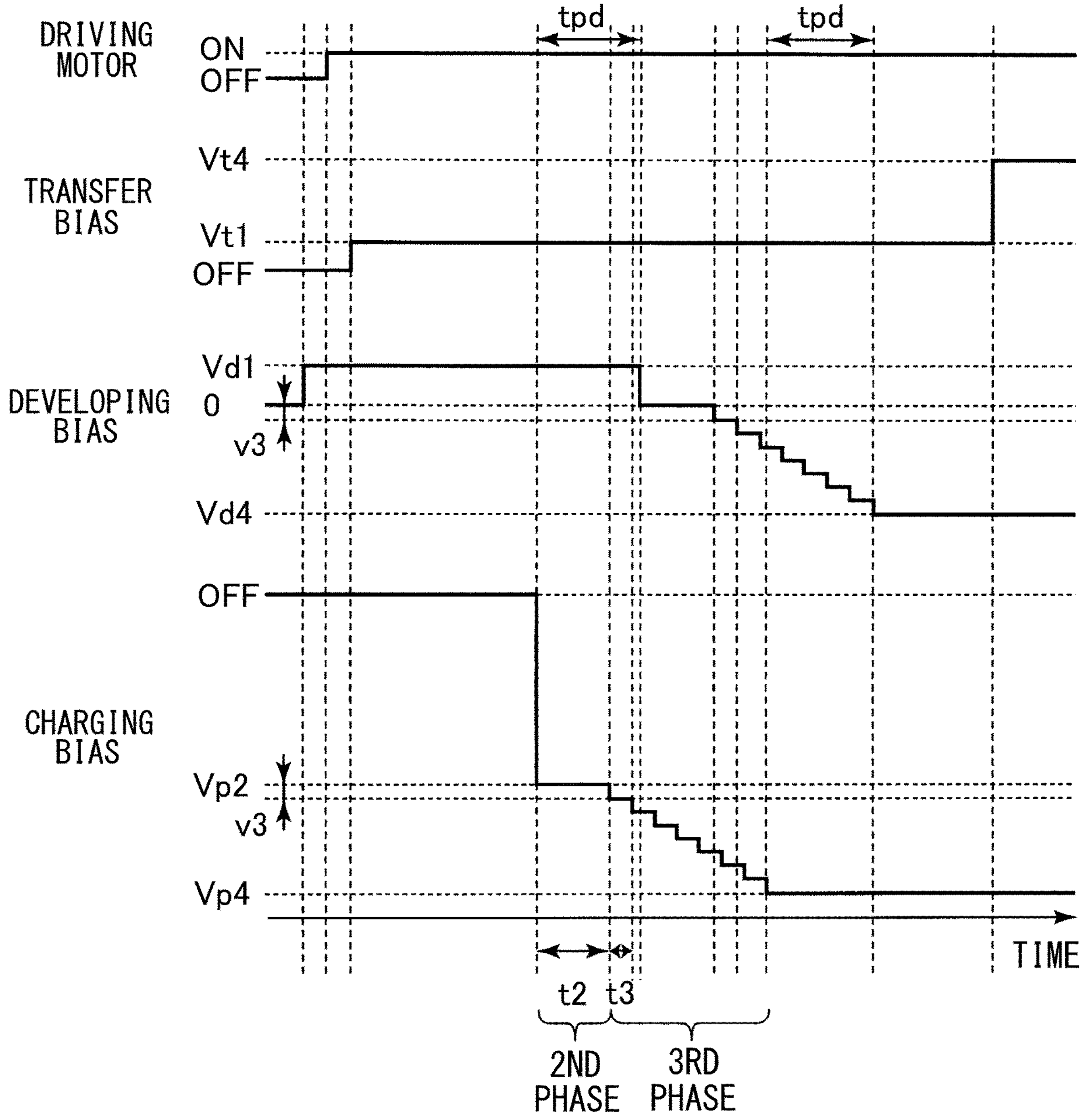
FIG. 4 is a timing chart of the preparation operation of the first comparative example.
Figure 5:
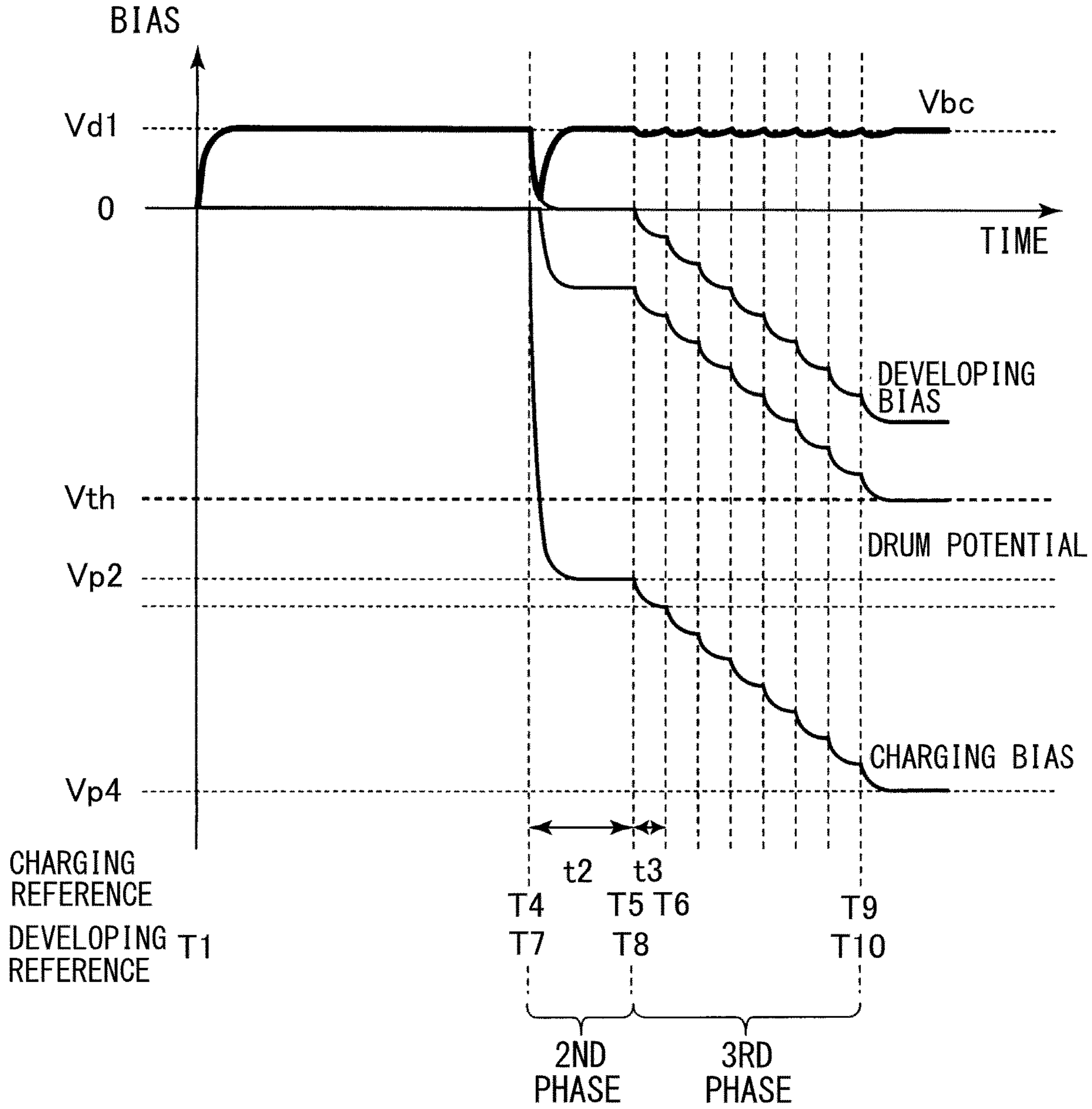
FIG. 5 is a timing chart showing the time transition of the potential and applied bias in the preparation operation of the first comparative example.

Further, Comparative Example 1 will also be explained using FIGS. 4 and 5. Comparative Example 1 differs from the present embodiment in that the first phase in the stepwise rise of the charging bias is not provided. The other points in Comparative Example 1 are substantially the same as the present embodiment. FIG. 4 is a timing chart similar to that related to the present embodiment shown in FIG. 2, related to the preparation operation of Comparative Example 1. Further, FIG. 5 is a timing chart similar to that related the present embodiment shown in FIG. 3, related to the preparation operation of Comparative Example 1. Incidentally, regarding the Comparative Example 1, the phases corresponding to the second and third phases in the stepwise rise of the charging bias of the present embodiment will also be referred to as the second and third phases, respectively.

As shown in FIGS. 2 and 3, in the present embodiment, first, at the timing T1, application of the developing bias Vd1 to the developing roller 41 is started. This also applies to Comparative Example 1, as shown in FIGS. 4 and 5. At this time, even if the CPU 9 controls the charging roller 2 to apply a predetermined bias, the desired bias value will not be outputted immediately, and it will take some time ("delay") for the bias value to stabilize. Further, at this time, the larger the changing amount of the bias, the longer the delay time. Further, at this time, the value of the surface potential of the photosensitive drum 1 is approximately 0V. For this reason, the back contrast Vbc, which is the potential difference between the surface potential of the photosensitive drum 1 and the developing bias, has approximately the same value as the absolute value of the developing bias, and shows a change corresponding to the delay of the developing bias.

Next, as shown in FIGS. 2 and 3, in the present embodiment, at the timing T3, application of the charging bias Vp1 to the charging roller 2 is started as a first phase. At this time, the charging bias Vp1 is set to a value whose absolute value is lower than the discharge start voltage Vth. For this reason, even if a charging bias is applied to the charging roller 2, the surface potential of the photosensitive drum 1 remains approximately 0V, and the back contrast Vbc does not change. Incidentally, as shown in FIGS. 4 and 5, Comparative Example 1 does not include a first phase in the stepwise rise of the charging bias; however, at the timing corresponding to this first phase, the surface potential of the photosensitive drum 1 is approximately 0V, which is the same as in the present embodiment.

Next, as shown in FIGS. 2 and 3, in the present embodiment, at the timing T4, application of the charging bias Vp2 to the charging roller 2 is started as a second phase. That is, in the present embodiment, at the timing T4, the charging bias is changed from Vp1 to Vp2.

On the other hand, as shown in FIGS. 4 and 5, in Comparative Example 1, at the timing T4, the charging bias is raised at once to Vp2 from a state in which the charging bias is not applied to the charging roller 2. Also, in both the present embodiment and Comparative Example 1, the charging bias Vp2 has an absolute value equal to or greater than the discharge start voltage Vth. For this reason, with the rise of the charging bias, discharge begins to occur between the surface of the photosensitive drum 1 and the charging roller 2, and the absolute value of the surface potential of the photosensitive drum 1 gradually increases. Further, in both the present embodiment and Comparative Example 1, the developing bias is switched to 0V at the timing T7, which is the same timing as the timing when the charging bias is switched to Vp2, based on the phase in the rotational direction of the photosensitive drum 1. Incidentally, similar to the charging bias, even if the developing bias is controlled to be 0V by the CPU 9, the output of the developing bias does not immediately become 0V, and a delay occurs. The back contrast Vbc changes depending on the delay of the developing bias and the degree of change in the surface potential of the photosensitive drum 1 described above.

Figure 6:
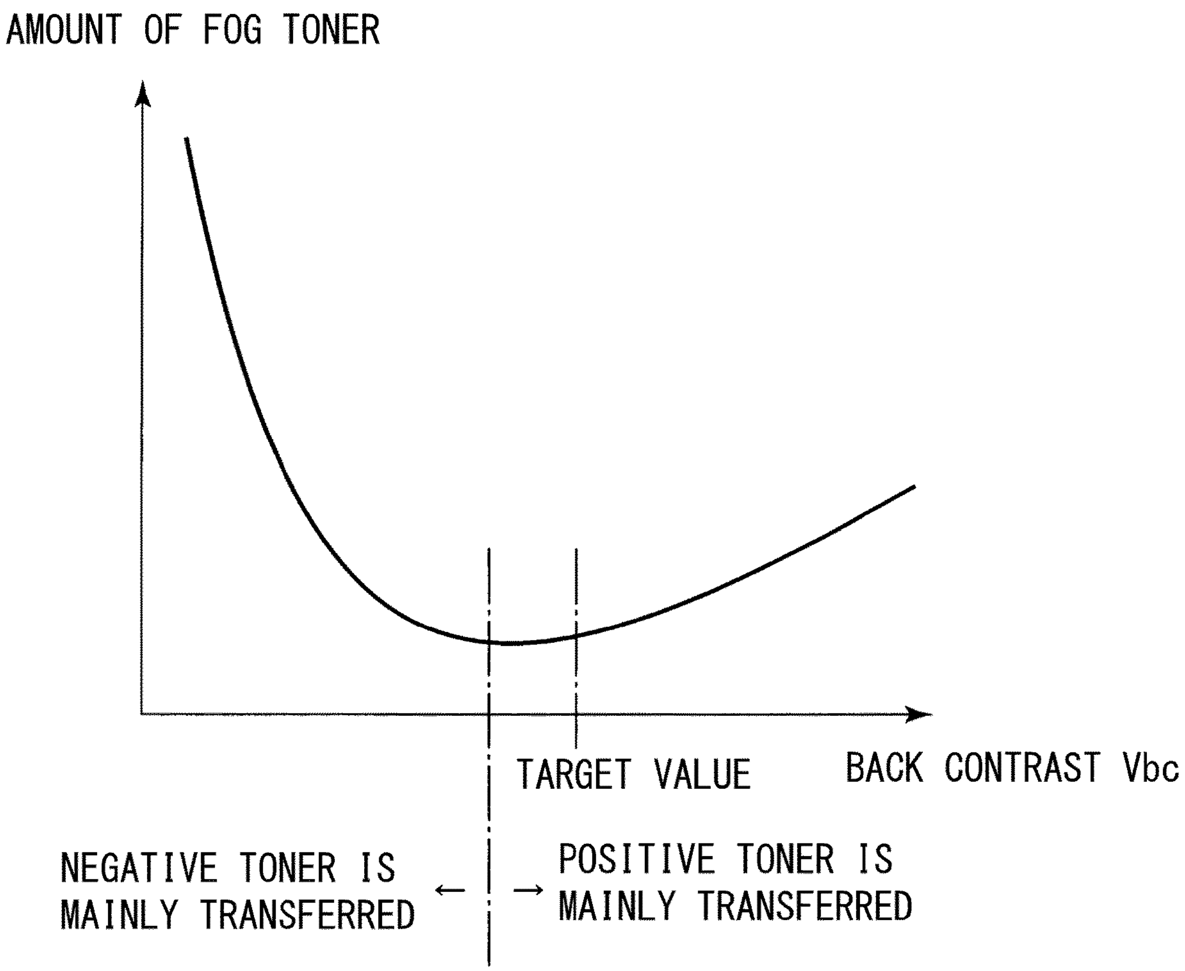
FIG. 6 is a graph schematically showing the relationship between the amount of fogging toner and back contrast.

Here, the effect of the back contrast Vbc on the amount of fogging toner adhering to the photosensitive drum 1 will be explained. FIG. 6 is a graph schematically showing the relationship between the amount of fogging toner adhering to the photosensitive drum 1 and the back contrast Vbc in the image forming apparatus 200 of the present embodiment. The amount of fogging toner has a minimum value with respect to the back contrast Vbc, and the amount of fogging toner increases even if the back contrast Vbc is too small or, conversely, too large. If the back contrast Vbc is small, negatively charged toner (negative toner) mainly adheres to the photosensitive drum 1 as fogging toner. Conversely, if the back contrast Vbc is large, positively charged toner (positive toner) mainly adheres to the photosensitive drum 1 as fogging toner. Generally, toner carried on the developing roller 41 does not hold a uniform charge, but has a certain degree of charge distribution. In the case of negatively charged toner, a large amount of toner is negatively charged, but there is also toner on the surface with almost no charge, and some of the toner has a positive charge. For this reason, when the back contrast Vbc becomes too large, this positively charged toner tends to adhere to the photosensitive drum 1. However, since a large amount of toner is negatively charged, the amount of fogging toner tends to increase to a greater extent when the back contrast Vbc decreases than when the back contrast Vbc increases.

Incidentally, the value of the back contrast Vbc will vary to some extent. This is due to the following reasons, for example. First, there is the effect of variation in the values of the charging bias and the developing bias due to internal resistance of the circuit and the like. Further, the effect of discharge varies, which is caused by scraping of the surface of the photosensitive drum 1 due to discharge and wear. Further, there is the effect of the discharge start voltage Vth changing due to a difference in the absolute amount of moisture in the air depending on the environment in which the image forming apparatus 200 is used. Further, there is the effect of the surface of the charging roller 2 being contaminated by external additives added to the toner. For this reason, it is desirable to set the back contrast Vbc so as to take into account variance in the back contrast Vbc and reduce the risk of increasing the amount of fogging toner. As described above, since a large amount of toner carried on the developing roller 41 is negatively charged, the amount of fogging toner tends to increase when the back contrast Vbc becomes smaller than when it becomes larger. For this reason, it is desirable to set the value of the back contrast Vbc to a value larger than the value at which the amount of fogging toner becomes minimum.

With this in mind, changes in the back contrast Vbc in the preparation operation of the present embodiment and Comparative Example 1 will be explained.

As shown in FIG. 5, in Comparative Example 1, the back contrast Vbc temporarily decreases immediately after the timings T4 and T7 at which the second phase is started. Incidentally, in Comparative Example 1, the timings T4 and T7, which start the second phase, are the timings at which the charging bias is raised to Vp2 and the developing bias is set to 0V. This is largely affected by delays in the charging bias and the developing bias. The charging bias and the developing bias do not switch immediately even when the CPU 9 sends a signal to each power source to change the setting value; a delay occurs, and the extent of this delay becomes more noticeable as the changing amount of the bias increases. In Comparative Example 1, the changing amount of the charging bias is larger than the changing amount of the developing bias. For this reason, the developing bias rises before the charging bias rises and the surface potential of the photosensitive drum 1 stabilizes, and the back contrast Vbc decreases until the developing bias stabilizes. When the back contrast Vbc decreases, the amount of fogging toner adhering to the photosensitive drum 1 increases significantly, as explained using FIG. 6.

On the other hand, as shown in FIG. 3, in the present embodiment, the extent to which the back contrast Vbc temporarily decreases immediately after the timings T4 and T7, which start the second phase, is smaller than that in Comparative Example 1. Incidentally, in the present embodiment, the timings T4 and T7, which start the second phase, are the timings at which the charging bias is switched from Vp1 to Vp2, and the developing bias is set to 0V. This is because, by raising the charging bias to Vp1 in advance in the first phase, the time required for the charging bias to rise to Vp2 becomes shorter than in Comparative Example 1. As a result, it is possible to suppress the back contrast Vbc from becoming extremely small, and to reduce fogging (fogging at startup).

Incidentally, as shown in FIG. 3, in the present embodiment, the back contrast Vbc may also temporarily decrease immediately after the timings T4 and T7, which start the second phase. This is due to the fact that the charging bias Vp1 in the first phase is set to a value whose absolute value is lower than the discharge start voltage Vth. If the absolute value of the charging bias Vp1 in the first phase is smaller to some extent than the discharge start voltage Vth, even if the second phase is started and the charging bias Vp2 is changed to an absolute value equal to or greater than the discharge start voltage Vth, the surface potential of the photosensitive drum 1 does not change immediately. That is, it takes a certain amount of time until the absolute value of the charging bias rises above the discharge start voltage Vth. Further, due to the effect of the difference in impedance, internal resistance of the circuit and the like between the developing roller 41 and the charging roller 2, a difference may occur in the delay of the developing bias and the charging bias. In addition, due to mechanical tolerances, the positional relationship between the charging roller 2 and the developing roller 41 may change depending on the phase in the rotational direction of the photosensitive drum 1, and the charging-development arrival time tpd may change. This may also result in a temporary reduction in back contrast in the present embodiment.

Figure 7:
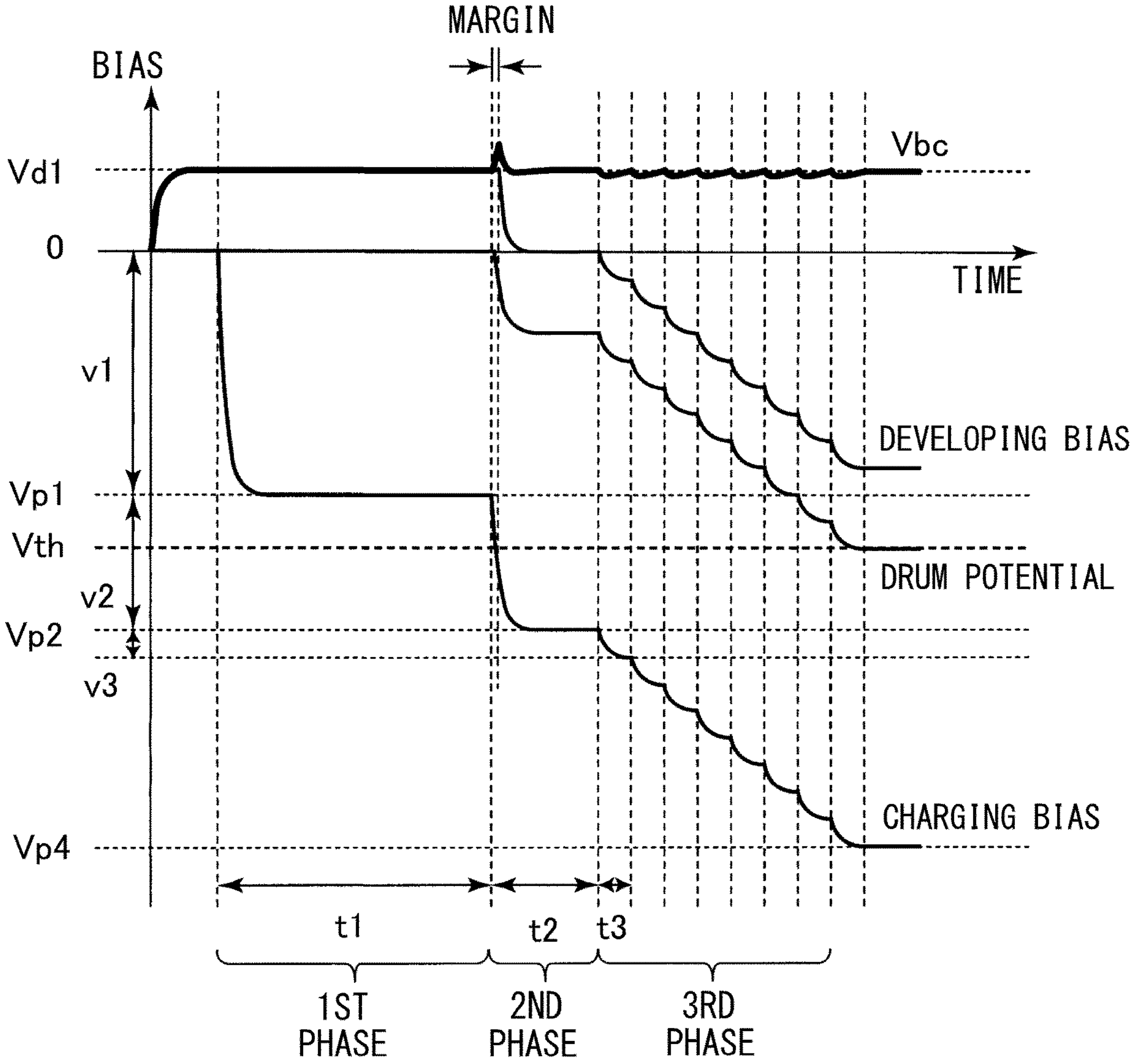
FIG. 7 is a timing chart showing the time transition of the potential and applied bias in the preparation operation of a modification of the first embodiment.

Here, in the present embodiment, the timing for switching the developing bias is set to be a timing that is delayed by the charging-development arrival time Vpd, with respect to the timing of switching the charging bias. On the other hand, the switching timing of the developing bias may be further delayed. FIG. 7 is a timing chart similar to that related to the present embodiment shown in FIG. 3, in the case where the timing (timing of starting the second phase) T7 for setting the developing bias to 0V is further delayed from the timing in the present embodiment. In this case, the back contrast Vbc increases temporarily immediately after the timing (timing of starting the second phase) T4 of switching the charging bias from Vp1 to Vp2. As explained using FIG. 6, when the back contrast Vbc becomes smaller, the increase in the amount of fogging toner is larger than when the back contrast Vbc becomes larger. For this reason, as shown in FIG. 7, providing a margin at the timing of switching the developing bias to the side where the back contrast Vbc increases reduces the risk of an increase in the amount of fogging toner.

Incidentally, the idea of further delaying the timing of switching the developing bias in this way can also be applied when the first phase in which a charging bias, whose absolute value is lower than the discharge start voltage Vth, is not applied in advance to the charging roller 2, as in Comparative Example 1. However, the amount of fogging toner also increases when the back contrast Vbc increases, although the amount of fogging toner is less than when the back contrast Vbc decreases. For this reason, it is desirable to maintain the back contrast Vbc at a value that does not deviate significantly from the target value as much as possible. Therefore, as shown in FIG. 7, even when a margin is provided in the timing of switching the developing bias, a charging bias, whose absolute value is lower than the discharge start voltage Vth, is applied in advance to the charging roller 2, as in the present embodiment. Thereby, it is possible to reduce the risk that the back contrast Vbc changes significantly, and the amount of fogging toner increases temporarily.

As shown in FIGS. 2 and 3, in the present embodiment, after the charging bias and the developing bias are changed in the second phase, the third phase is started at the timings T5 and T8. In the third phase, the charging bias and the developing bias are each changed by a changing amount v3, and each bias value is continued for the time t3. This is repeated several times.

In the present embodiment, by repeating this bias change 8 times, the charging bias and the developing bias are respectively raised to the charging bias Vp4 and the developing bias Vd4 during image formation. This also applies to Comparative Example 1, as shown in FIGS. 4 and 5.

As described above, the greater the changing amount of bias, the greater the degree of delay. In other words, by changing the bias little by little, the effect of the delay can be reduced. For this reason, in order to reduce variance in the back contrast Vbc, it is desirable to change the bias little by little as in the third phase. Incidentally, as the bias is changed in small increments, the time required for the charging bias and the developing bias to rise to the values at the time of image formation becomes longer. However, in the present embodiment, in the preparation operation before proceeding to image formation, several operations are performed in parallel, in addition to raising the bias. Also, the CPU 9 sets a flag to proceed to image formation when all of these bias rises and operations other than bias rises are completed. Operations other than the aforementioned bias rises include, for example, an operation of heating the fixing device 6 to a desired temperature, an operation of developing image information, and the like.

In these operations, it is desirable to appropriately set the time required to raise the bias within a range in which the rise of the bias does not become rate-determining for the aforementioned flag.

As an example, in the stepwise rise of the charging bias and the developing bias, the changing amount v3 of the target bias value in the third phase is 50V and the maintaining time (duration) of the target bias value in the first stage is 30 ms; however, they are not limited to these values. The changing amount v3 and the maintaining time can be appropriately set so as to maintain the back contrast Vbc in the developing portion P3 within a predetermined range (approaches a predetermined value). For example, the back contrast Vbc is preferably within the range of ±80V of the target value, or more preferably, within the range of ±50V. As a result, fogging can be suppressed, and toner consumption due to fogging can be suppressed. Therefore, by setting the changing amount v3 preferably to 80V or lower, or more preferably to 50V or lower, the back contrast Vbc can be prevented from deviating from a predetermined range, even if there is a difference in the rising characteristics between the charging bias and the developing bias. Further, the maintaining time is a time sufficient for the bias actually applied to the charging roller 2 and the developing roller 41 to reach the target value after the change, and can be set appropriately so as to prevent the overall time to start up the bias from being too long. The overall time for the stepwise rise of the charging bias and the developing bias is, for example, preferably 1 s or less, or more preferably 500 ms or less.

Here, in the present embodiment, a changing amount v1 (absolute value of the charging bias Vp1) of the charging bias v1 in the first phase and a changing amount v2 (difference between the charging biases Vp1 and Vp2) of the charging bias in the second phase are set to be larger than the changing amount v3 of the charging bias for each time in the third phase. This is due to the following reasons.

First, the changing amount v2 of the charging bias in the second phase will be explained. As described above, in the second phase, the charging bias is changed from Vp1, whose absolute value is lower than the discharge start voltage Vth, to Vp2, whose absolute value is equal to or greater than the discharge start voltage Vth. Since the discharge start voltage Vth changes depending on the environment (absolute moisture content) in which the image forming apparatus 200 is used, it is difficult to specify the discharge start voltage Vth exactly. For this reason, it is desirable to reduce as much as possible the time during which the surface potential of the photosensitive drum 1 is unclear by raising Vp1, whose absolute value is lower than the discharge start voltage Vth, to Vp2 whose absolute value is equal to or greater than the discharge start voltage Vth, with a somewhat large potential difference all at once. However, if the changing amount v2 of the charging bias in the second phase is too large, the delay in the charging bias will become large. It is desirable to set the changing amount v2 of the charging bias in the second phase while considering these points.

On the other hand, it is desirable that the changing amount v1 of the charging bias in the first phase is set to be as large as possible within a range where the absolute value of the charging bias does not exceed the discharge start voltage Vth. In the first phase, the surface of the photosensitive drum 1 is not charged in the first place, so it is not necessary to be concerned about the back contrast Vbc varying due to the delay of the charging bias. For this reason, before raising the charging bias in the second phase to Vp2 whose absolute value is greater than or equal to the discharge start voltage Vth, it is desirable to raise the charging bias in the first phase to Vp1, whose absolute value is lower than the discharge start voltage Vth and as large as possible.

For this reason, the changing amount v1 of the charging bias in the first phase, the changing amount v2 of the charging bias in the second phase, and the changing amount (change in the target value) v3 of the charging bias for each time in the third phase, are preferably set to the relation v1>v2>v3. As an example, v1=400V, v2=200V, and v3=50V.

Further, the application time (maintaining time of the target value) t1 of the charging bias in the first phase, the application time (maintaining time of the target value) t2 of the charging bias in the second phase, and the application time t3 of the charging bias of each value in the third phase is preferably set to the relation t1>t2>t3. In other words, as described above, the greater the changing amount of the bias, the greater the effect of the delay. For this reason, the larger the changing amount of the bias, it is preferable to set a longer bias application time. As an example, t1=300 ms (for example, the time for the photosensitive drum 1 to rotate approximately one full turn), t2=120 ms, and t3=30 ms.

Further, in the present embodiment, as described above, when starting the second phase of the developing bias, after the feedback circuit (not shown) detects that the output of the developing positive power source 82 has attenuated to 0V, the output of the developing negative power source 83 is set to 0V. This is to prevent circuit failure from exceeding the withstand voltage of the developing positive power source 82, whose maximum output is set to be weak in the above feedback, when the developing positive power source 82 and the developing negative power source 83 are turned ON at the same time. For this reason, it is desirable for the application time t2 of the charging bias (and the developing bias) in the second phase to be longer than the application time t3 of the charging bias (and the developing bias) of each value in the third phase. Further, in the present embodiment, as described in detail in the second embodiment, the application of the transfer bias Vt1 is started at approximately the same time as the application of the charging bias Vp1 is started in the first phase. For this reason, it is desirable for the application time t1 of the charging bias in the first phase to be longer than the application time t2 of the charging bias in the second phase.

4. Effect

As described above, in the present embodiment, the image forming apparatus 200 includes a rotatable image bearing member (photosensitive drum) 1; a charging member (charging roller) 2 configured to charge the surface of the image bearing member 1; a developing member (developing roller) 41 in contact with the surface of the image bearing member 1 in a developing portion P3 and configured to form a toner image by supplying toner to the surface of the image bearing member 1 charged by the charging member 2; a charging bias applying portion (charging negative power source) 81 configured to apply a charging bias to the charging member 2; developing bias applying portions (developing positive power source, developing negative power source) 82 and 83 configured to apply a developing bias to the developing member 41; and a controlling portion (CPU) 9 configured to control the charging bias applying portion 81 and the developing bias applying portions 82 and 83, wherein the controlling portion 9 controls to perform a preparation operation before the start of image formation in which the toner image to be transferred to a recording material S is formed on the image bearing member 1 so that rotation of the image bearing member 1 is started in a state in which the developing member 41 is in contact with the image bearing member 1, and the charging bias and the developing bias are changed stepwise respectively so that the potential difference between the surface potential of the image bearing member 1 and the developing bias in the developing portion P3 becomes a predetermined value. Also, in the present embodiment, while changing stepwise the charging bias in the preparation operation, the controlling portion 9 controls the charging bias applying portion 81 so as to change the charging bias to a charging bias of the same polarity as during the image formation and an absolute value thereof lower than a discharge start voltage from a state in which the charging bias is not applied to the charging member 2, and then so as to change the charging bias to a plurality of values having the same polarity as during the image formation and the absolute value thereof equal to or greater than the discharge start voltage.

In the present embodiment, in the preparation operation, the controlling portion 9 controls the charging bias applying portion 81 to sequentially stepwise change the charging bias to a first charging bias of the same polarity as during the image formation and the absolute value thereof lower than the discharge start voltage, a second charging bias of the same polarity as during the image formation and the absolute value thereof equal to or greater than the discharge start voltage, and a plurality of third charging biases of the same polarity as during the image formation, the absolute value thereof greater than the second charging bias and the absolute value thereof increased stepwise so that the charging bias becomes a value during the image formation. Further, in the present embodiment, in the preparation operation, when a changing amount of the bias from the state in which the charging bias is not applied to the charging member 2 to the first charging voltage is defined as v1, a changing amount of the bias from the first charging bias to the second charging bias is defined as v2, and a changing amount of the bias in each step of the plurality of third charging biases is defined as v3, the controlling portion 9 controls the charging bias applying portion 81 so as to satisfy the following relation, v1>v2>v3. Further, in the present embodiment, in the preparation operation, when a time when the first charging bias is applied to the charging member 2 is defined as t1, a time when the second charging bias is applied to the charging member 2 is defined as t2, and a time when the bias in each step of the plurality of third charging biases is applied to the charging member 2 is defined as t3, the controlling portion 9 controls the charging bias applying portion 81 so as to satisfy the following relation, t1>t2>t3.

Further, in the present embodiment, in the preparation operation, the controlling portion 9 controls the developing bias applying portions 82 and 83 to sequentially stepwise change the developing bias to a first developing bias of an opposite polarity to during the image formation, a second developing bias of substantially 0V, and a plurality of third developing biases of the same polarity as during the image formation and an absolute value thereof stepwise increased so that the developing bias becomes a value during the image formation, and to apply the first developing bias to the developing member 41 before start of rotation of the image bearing member 1 and to apply the second developing bias and the third developing bias to the developing member 41 after start of rotation of the image bearing member 1.

Also, as described above, according to the present embodiment, it is possible to suppress a temporary increase in fogging in the preparation operation before image formation.

Next, other embodiments of the present invention will be described. The basic configuration and operation of the image forming apparatus of the present embodiment are the same as those of the image forming apparatus of the first embodiment. Therefore, in the image forming apparatus of the present embodiment, parts having the same or corresponding functions or configurations as those of the image forming apparatus of the first embodiment are designated by the same reference numerals as those of the image forming apparatus of the first embodiment, and detailed explanations are omitted.

In the first embodiment, the rise of the charging bias and the developing bias in the preparation operation was explained. In the present embodiment, control of the transfer bias in the preparation operation will be described. Incidentally, the preparation operation in the present embodiment is also the same as the preparation operation in the first embodiment shown in FIG. 2, so the overall description of the preparation operation will be omitted where appropriate. Incidentally, here, the transfer bias control of the present embodiment will be explained here as being applied to the preparation operation of the first embodiment; however, it is also possible to use a transfer bias control different from the present embodiment in the preparation operation of the first embodiment.

1. Transfer Bias Polarity and Application Timing

As shown in FIG. 2, in the present embodiment, at the timing T3, at which application of the charging bias Vp1 to the charging roller 2 is started as a first phase, application of the transfer bias Vt1 to the transfer roller 5 is also started substantially simultaneously. At this time, the transfer bias Vt1 has the same polarity as the transfer bias applied during image formation. Further, the time required for the surface of the photosensitive drum 1 to move from the developing portion P3 to the transfer portion P4 is defined as a development-transfer arrival time tdt. At this time, application of the transfer bias Vt1 to the transfer roller 5 is started at the timing T3 before the development-transfer arrival time tdt has elapsed from the timing T2 when driving of the drive motor 10 is started. This is to reduce the amount of fogging toner, which adhered to the photosensitive drum 1 due to fogging at startup, that adheres to the transfer roller 5. Incidentally, application of the transfer bias Vt1 to the transfer roller 5 may be started after the timing T3 at which application of the charging bias Vp1 to the charging roller 2 is started, as long as it is within the development-transfer arrival time tdt.

As described in the first embodiment, by applying the developing bias Vd1 of opposite polarity during image formation and then starting driving of the drive motor 10, a predetermined back contrast Vbc can be provided so as to reduce fogging at startup. However, as explained using FIG. 6, even if the back contrast Vbc is increased, a certain amount of fogging toner adheres to the surface of the photosensitive drum 1. At this time, a large proportion of the fogging toner adhered to the photosensitive drum 1 is positively charged. The proportion of positively charged toner (more specifically, toner that is not sufficiently negatively charged) of the fogging toner adhering to the photosensitive drum 1 due to fogging at startup increases for the following reasons. That is, in order to impart a predetermined charge to the toner, as the developing roller 41 rotates, toner carried on the developing roller 41 is friction charged by the regulating blade 42. Incidentally, by providing a potential difference between the developing roller 41 and the regulating blade 42, a charge may be injected into the toner. The charge imparted to the toner does not significantly attenuate in a short period of time during the image forming process. However, when the image forming process is completed and the image forming apparatus 200 is left unused for a long time, the charge on the toner attenuates over time, and the toner becomes substantially free of charge. Of the toner carried on the developing roller 41, when the image forming apparatus 200 (drive motor 10) is stopped, toner located in the area between the contact portion with the regulating blade 42 in the rotational direction of the developing roller 41 and the contact portion with the photosensitive drum 1 reaches the contact portion with the photosensitive drum 1 without passing through the contact portion with the regulating blade 42 at the start of the image forming apparatus 200. At least the toner located in this area has a charge distribution state in which it has almost no charge over time. This toner in a charge distribution state with almost no charge becomes distributed into negative polarity toner and positive polarity toner due to rubbing between the photosensitive drum 1 and the developing roller 41. Therefore, positive polarity toner generated by rubbing is likely to adhere to the surface of the photosensitive drum 1 due to the electric field (back contrast Vbc) formed by the preparation operation. For this reason, the fogging toner adhering to the photosensitive drum 1 due to fogging at startup has a large proportion of positive polarity toner that is likely to adhere to the surface of the photosensitive drum 1 due to the electric field caused by the back contrast Vbc.

For this reason, in order to reduce contamination of the transfer roller 5 caused by positively charged fogging toner, which adhered to the photosensitive drum 1 due to fogging at startup, adhering to the transfer roller 5, it is preferable for the transfer roller 5 to be set to a positive polarity, that is, to apply a transfer bias with the same polarity as during image formation. Further, it is preferable to start applying this positive transfer bias to the transfer roller 5 before the fogging toner adhered to the photosensitive drum 1 at the developing portion P3 reaches the transfer portion P4.

However, in order to suppress contamination of the transfer roller 5 due to fogging at startup, it is desirable that the absolute value of the transfer bias applied to the transfer roller 5 is not too large. Generally, when applying a positive transfer bias to the negatively charged surface of the photosensitive drum 1, if the transfer bias is too strong, the following phenomenon may occur. That is, the charge excited inside the photosensitive layer of the photosensitive drum 1 can no longer return, and a phenomenon called "transfer memory" may occur, which appears as a white spot image where the image is partially missing. At the timing when application of the transfer bias to the transfer roller 5 is started in the preparation operation, the surface potential of the photosensitive drum 1 is approximately 0V. In such a state, there is a greater risk that transfer memory will occur due to the transfer bias. For this reason, it is desirable that the transfer bias Vt1 applied to the transfer roller 5 in the preparation operation to be lower than the discharge start voltage between the photosensitive drum 1 and the transfer roller 5.

2. Transfer Bias Control Method

In recent years, the size and cost of the image forming apparatus 200 have been reduced, and, for example, the following high voltage configuration is sometimes used as a transfer bias power source. That is, the output itself when the high voltage is turned ON is not variable, but the macro output value of the bias is configured to be controlled by finely repeatedly turning the high voltage ON and OFF over a predetermined period and changing the ratio of the ON/OFF times. In this configuration, it is preferable to fix the ON time and make the OFF time variable. As a result, the output value of the transfer bias can be processed as a function having no extreme value, and it becomes easy to derive the OFF time for applying a predetermined transfer bias.

FIG. 8 is a schematic view showing a time change in the output value of the high voltage when the macro output value of the bias is changed by changing the ratio of the ON/OFF time of the high voltage. Parts (a) and (b) of FIG. 8 show the time change in the output value of the high voltage when the ON time length (ON time) and the ON output value are the same, and only the OFF time length (OFF time) is changed. Specifically, part (a) of FIG. 8 shows a case in which the OFF time is the same time (1:1) as the ON time, and part (b) of FIG. 8 shows a case in which the OFF time is set to be 5 times longer (1:5) than the ON time. It can be seen that by changing the OFF time, the average value of the output shown by the broken line changes with respect to the output value of the ON time. At this time, the longer the OFF time is, the smaller the average value of the output bias becomes; on the other hand, the ripple deteriorates. Further, although the OFF time is counted by the CPU 9, the number of counts reaches a certain limit due to the limitations of the CPU 9, and it becomes impossible to process the OFF time longer than a predetermined value. Further, by shortening the ON time, it is also possible to decrease the average value of the output bias. However, when considering variances in signal response and circuit resistance, there is a limit to the minimum time during which the bias can be reliably applied.

In the present embodiment, a transfer bias of a predetermined voltage value is applied to the transfer roller 5 by superposing and applying a high voltage of a predetermined polarity and a high voltage of a polarity opposite to the predetermined polarity with respect to the transfer roller 5. As described in the first embodiment, the transfer roller metal core 51 is connected to the charging negative power source 81 via the transfer positive power source 84. As a result, the configuration is such that a predetermined bias is applied to the transfer roller 5 by adjusting the respective biases outputted from the charging negative power source 81 and the transfer positive power source 84. As described above, when outputting a positive transfer bias with a low output value, if the output is attempted using only the transfer positive power source 84, a waveform with bad ripples may result. Further, due to the restrictions described above, there may be cases in which it is not possible to output a transfer bias with a low output value in the first place. Accordingly, at the same time as the transfer positive power source 84 outputs a positive transfer bias, the charging negative power source 84 outputs a negative charging bias. As a result, it is possible to output a transfer bias with a low output value.

FIG. 9 is a chart showing the respective output values of the charging negative power source 81 and the transfer positive power source 84 in the present embodiment, and the output value of the transfer bias applied to the transfer roller 5 by superimposing these values. Incidentally, the output value of the transfer bias actually has a delay similar to the charging bias and developing bias shown in FIG. 3, and minute ripples are generated as shown in the Figure. However, in FIG. 9, delays and ripples are omitted for simplicity.

As described above, in order to reduce contamination of the transfer roller 5 due to fogging at startup, the output of the transfer bias Vt1 is started at the timing T3 before the development-transfer arrival time tdt has elapsed from the start of driving the drive motor 10. At this time, in order to suppress the transfer memory, the transfer bias Vt1 is set to a value lower than the discharge start voltage Vth. When outputting a transfer bias with such a low output value, if adjusting the output value is attempted by the transfer positive power source 84 only, there is a possibility that the ripples will worsen. In contrast, in the present embodiment, the charging bias Vp1 is outputted by the charging negative power source 81 at the same time as a transfer bias Vt1' is outputted by the transfer positive power source 84. At this time, the value of the charging bias Vp1 is set as described in the first embodiment. Then, by adjusting the transfer bias Vt1', the sum value of the transfer bias Vt1' and the charging bias Vp1 is set to be the output value Vt1 of the transfer bias. Thereafter, in response to the stepwise rise of the charging bias as described in the first embodiment, the transfer bias is set to be a predetermined output value by adjusting the transfer bias outputted from the transfer positive power source 84. In the present embodiment, the target value of Vt1' is set to 500V, and since Vp1 is −400V, Vt1=100V is outputted.

Incidentally, the transfer bias outputted during image formation is generally set to a value greater than the discharge start voltage Vth. If only the OFF time is changed under a constant ON time as shown in FIG. 8, there may be a limit in attaining a predetermined output value during image formation. In such a case, a plurality of values may be set in advance as the ON time, and the length of the ON time may be changed between image formation when a certain level of high output is required and the preparation operation described in the present embodiment. Incidentally, when a plurality of values are set as the ON time, it is necessary to prepare reference tables and the like for control corresponding to each ON time in the memory 14 incorporated in the image forming apparatus 200. For this reason, it is desirable that the number of values set as the ON time be the minimum necessary.

In addition, in the preparation operation, the rise of the transfer bias is controlled along with the control of the rise of the charging bias and the developing bias. At this time, the following current detection control may be performed. In the case of an image forming apparatus 200 as in the present embodiment that does not include an intermediate transfer member and transfers a toner image from the photosensitive drum 1 directly to the recording material S, a constant current control, in which current flowing between the photosensitive drum 1 and the transfer roller 5 during image formation is controlled to be constant, is widely used. As a preparation operation for this purpose, the value of the current flowing through the transfer roller 5 with respect to a predetermined transfer bias is detected in a state where there is no recording material S between the photosensitive drum 1 and the transfer roller 5. Also, by calculating the impedance of the photosensitive drum 1 and the transfer roller 5, the transfer bias Vt4 applied during image formation is determined. As shown in FIG. 2, this current detection control is started at a timing T11 when the rise of each bias is completed, and after the current detection control is performed, the process proceeds to the image forming process.

Further, in the present embodiment, the transfer bias Vt1 at the time of the preparation operation is raised at once to the transfer bias Vt4 at during image formation; however, as in the third phase in the stepwise rise of the charging bias, it is possible to raise the transfer bias stepwise with fine potential differences.

3. Effect

In this way, in the present embodiment, the image forming apparatus 200 further comprises a transfer member (transfer roller) 5 in contact with the image bearing member 1 in a transfer portion P4 and configured to transfer the toner image formed on the surface of the image bearing member 1 to the recording material S; and a transfer bias applying portion 84 configured to apply a transfer bias to the transfer member 5, wherein in the preparation operation, the controlling portion 9 controls the transfer bias applying portion (transfer positive power source) 84 to start applying a predetermined transfer bias of the same polarity as during the image formation to the transfer member 5 before an area of the surface of the image bearing member 1 positioned in a developing portion P3 when the rotation of the image bearing member 1 is started reaches first the transfer portion P4 after the rotation of the image bearing member 1 is started. In the present embodiment, the controlling portion 9 controls the transfer bias applying portion 84 so that an absolute value of the predetermined transfer bias becomes lower than that during the image formation. In particular, in the present embodiment, the controlling portion 9 controls the transfer bias applying portion 84 so that the absolute value of the predetermined transfer bias becomes lower than the discharge start voltage. Further, in the present embodiment, the transfer member 5 is connected to the transfer bias applying portion (transfer positive power source) 84 and the charging bias applying portion (charging negative power source) 81, wherein the controlling portion 9 controls the transfer bias to be applied to the transfer member 5 by controlling a bias outputted from the charging bias applying portion 81 and the transfer bias applying portion 84, and wherein in the preparation operation, the controlling portion 9 controls the charging bias applying portion 81 and the transfer bias applying portion 84 so as to apply the predetermined transfer bias, which is superposed by a bias outputted from the charging bias applying portion 81 and a bias outputted from the transfer bias applying portion 84, to the transfer member 5 when the charging bias lower than the discharge start voltage is applied to the charging member 2 from the charging bias applying portion 81. Further, in the present embodiment, the controlling portion 9 controls to adjust an output value of the transfer bias applying portion 84 to the transfer member 5 by controlling a ratio between an ON time when the transfer bias applying portion 84 outputs a predetermined bias and an OFF time when an output of the transfer bias applying portion 84 has been stopped. Here, the controlling portion 9 can control the transfer bias applying portion 84 so as to shorten the ON time during the image formation than the ON time in the preparation operation.

Also, as explained above, by controlling the transfer bias as in the present embodiment, it is possible to suppress contamination of the transfer roller 5 due to fogging at startup while reducing the size and cost of the apparatus.

Although the present invention has been described above with reference to specific examples, the present invention is not limited to the above embodiments.

In the above embodiment, the developing roller 41 has been described as always being in contact with the photosensitive drum 1; however, the developing roller 41 may be separated from the photosensitive drum 1 when the process cartridge 100 is not in use. As described above, the developing roller 41 is configured to include the conductive developing roller metal core 411 and the conductive rubber layer 412, and the conductive rubber layer 412 contacts the photosensitive drum 1. When the conductive rubber layer 412 having elasticity comes into contact for a long period of time with the photosensitive drum 1, which is a more rigid member, the contact portion of the conductive rubber layer 412 with the photosensitive drum 1 is deformed, and image defects in the form of horizontal stripes may occur. On the other hand, for example, the following configuration may be used. That is, for example, when manufacturing the process cartridge 100, a spacing member is configured to be provided on the developing roller metal core 411. Also, for example, when the process cartridge 100 is used for the first time, the configuration can be such that the clutch of the aforementioned spacing member disengages, and the developing roller 41 comes into contact with the photosensitive drum 1. As a result, the developing roller 41 and the photosensitive drum 1 are kept separate until the process cartridge 100 starts to be used, and deformation of the conductive rubber layer 412 of the developing roller 41 can be prevented.

Further, in the preparation operation of the first embodiment, a transfer bias control different from that of the second embodiment can be used. For example, a transfer bias with the same polarity as that during image formation in the preparation operation and a smaller absolute value than that during image formation, and a transfer bias during image formation may be applied to the transfer roller 5 from only the transfer power source (without superimposing the charging bias).

Further, the image forming apparatus to which the present invention can be applied is not limited to the image forming apparatus having the basic configuration shown in the above embodiments. For example, the present invention can also be applied to a color image forming apparatus that includes a plurality of removable process cartridges (developing devices) and uses an intermediary transfer member such as an intermediary transfer belt to transfer toner images with a plurality colors to a recording material to form a full-color image and the like. Further, in the above embodiments, the image forming apparatus is configured to have a removable process cartridge; however, the present invention can also be applied to an image forming apparatus with a process unit similar to that constituting the process cartridge in the above embodiments that is provided in the main assembly of the apparatus.

According to the present invention, it is possible to suppress a temporary increase in fogging in the preparation operation before image formation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025649 filed on Feb. 21, 2023, which is hereby incorporated by reference herein in its entirety.

What is claimed is:

1. An image forming apparatus comprising:

a rotatable image bearing member;

a charging member configured to charge a surface of the image bearing member;

a developing member in contact with the surface of the image bearing member in a developing portion and configured to form a toner image by supplying toner to the surface of the image bearing member charged by the charging member;

a charging voltage applying portion configured to apply a charging voltage to the charging member;

a developing voltage applying portion configured to apply a developing voltage to the developing member; and a controller configured to control the charging voltage applying portion and the developing voltage applying portion, wherein the controller controls to perform a preparation operation before start of image formation in which the toner image to be transferred to a recording material is formed on the image bearing member so that rotation of the image bearing member is started in a state in which the developing member is in contact with the image bearing member, and the charging voltage and the developing voltage are changed stepwise respectively so that a potential difference between a surface potential of the image bearing member and the developing voltage in the developing portion becomes a predetermined value, wherein while changing stepwise the charging voltage in the preparation operation, in a state in which the developing member is rotating while in contact with the image bearing member, the controller controls the charging voltage applying portion so as to change the charging voltage to a first charging voltage of the same polarity as during the image formation and an absolute value thereof lower than a discharge start voltage from a state in which the charging voltage is not applied to the charging member, and then so as to change the charging voltage to a second charging voltage, of the same polarity as during the image formation and the absolute value thereof equal to or greater than the discharge start voltage, from the first charging voltage, wherein an absolute value of the first charging voltage is greater than a difference between the absolute value of the second charging voltage and the absolute value of the first charging voltage.

2. The image forming apparatus to claim 1, wherein in the preparation operation, the controller controls the charging voltage applying portion to sequentially stepwise change the charging voltage to the first charging voltage, to the second charging voltage, and to a plurality of third charging voltages of the same polarity as during the image formation, the absolute value thereof greater than the second charging voltage and the absolute value thereof increased stepwise discharge start so that the charging voltage becomes a value during the image formation.

3. The image forming apparatus to claim 2, wherein in the preparation operation, when a changing amount of the voltage from the state in which the charging voltage is not applied to the charging member to the first charging voltage is defined as v1, a changing amount of the voltage from the first charging voltage to the second charging voltage is defined as v2, and a changing amount of the voltage in each step of the plurality of third charging voltage is defined as v3, the controller controls the charging voltage applying portion so as to satisfy the following relation, $$v1 > v2 > v3.$$

4. The image forming apparatus to claim 3, wherein in the preparation operation, when a time when the first charging voltage is applied to the charging member is defined as t1, a time when the second charging voltage is applied to the charging member is defined as t2, and a time when the voltage in each step of the plurality of third charging voltage is applied to the charging member is defined as t3, the controller controls the charging voltage applying portion so as to satisfy the following relation, $$t1 > t2 > t3.$$

5. The image forming apparatus to claim 1, wherein in the preparation operation, the controller controls the developing voltage applying portion to sequentially stepwise change the developing voltage to a first developing voltage of an opposite polarity during the image formation, a second developing voltage of substantially 0V, and a plurality of third developing voltages of the same polarity as during the image formation and an absolute value thereof stepwise increased so that the developing voltage becomes a value during the image formation, and to apply the first developing voltage to the developing member before start of rotation of the developing member and to apply the second developing voltage and the third developing voltage to the developing member after start of rotation of the developing member.

6. The image forming apparatus to claim 1, further comprising: a transfer member in contact with the image bearing member in a transfer portion and configured to transfer the toner image formed on the surface of the image bearing member to the recording material; and a transfer voltage applying portion configured to apply a transfer voltage to the transfer member, wherein in the preparation operation, the controller controls the transfer voltage applying portion to start applying a predetermined transfer voltage of the same polarity as during the image formation to the transfer member before an area of the surface of the image bearing member positioned in the developing portion when the rotation of the image bearing member is started reaches first the transfer portion after the rotation of the image bearing member is started.

7. The image forming apparatus to claim 6, wherein the controller controls the transfer voltage applying portion so that an absolute value of the predetermined transfer voltage becomes lower than during the image formation.

8. The image forming apparatus to claim 7, wherein the controller controls the transfer voltage applying portion so that the absolute value of the predetermined transfer voltage becomes lower than the discharge start voltage.

9. The image forming apparatus to claim 7, wherein the transfer member is connected to the transfer voltage applying portion and the charging voltage applying portion, wherein the controller controls the transfer voltage to be applied to the transfer member by controlling a voltage outputted from the charging voltage applying portion and the transfer voltage applying portion, and wherein in the preparation operation, the controller controls the charging voltage applying portion and the transfer voltage applying portion so as to apply the predetermined transfer voltage, which is superposed by a voltage outputted from the charging voltage applying portion and a voltage outputted from the transfer voltage applying portion, to the transfer member when the charging voltage lower than the discharge start voltage is applied to the charging member from the charging voltage applying portion.

10. The image forming apparatus to claim 7, wherein the controller controls to adjust an output value of the transfer voltage applying portion to the transfer member by controlling a ratio between an ON time when the transfer voltage applying portion outputs a predetermined voltage and an OFF time when an output of the transfer voltage applying portion has been stopped.

11. The image forming apparatus to claim 10, wherein the controller controls the transfer voltage applying portion so as to shorten the ON time during the image formation than the ON time in the preparation operation.

* * * * *